United States Patent
Nakano

(10) Patent No.: US 9,829,942 B2
(45) Date of Patent: Nov. 28, 2017

(54) METHOD, APPARATUS AND RECORDING MEDIUM FOR DETECTING CHANGE OF POSITION OF WIRELESSLY CHARGEABLE ELECTRONIC DEVICE

(71) Applicant: CANON KABUSHIKI KAISHA, Tokyo (JP)

(72) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 14/300,025

(22) Filed: Jun. 9, 2014

(65) Prior Publication Data

US 2014/0365807 A1 Dec. 11, 2014

(30) Foreign Application Priority Data

Jun. 11, 2013 (JP) .................................. 2013-123213

(51) Int. Cl.
| G06F 1/26 | (2006.01) |
| H04N 5/232 | (2006.01) |
| H02J 50/12 | (2016.01) |
| H02J 50/90 | (2016.01) |
| H02J 50/80 | (2016.01) |

(52) U.S. Cl.
CPC ............... *G06F 1/26* (2013.01); *H02J 50/12* (2016.02); *H02J 50/80* (2016.02); *H02J 50/90* (2016.02); *H04N 5/23241* (2013.01)

(58) Field of Classification Search
CPC ... G06F 1/26; H02J 50/80; H02J 50/90; H02J 50/12; H04N 5/23241
See application file for complete search history.

(56) References Cited

U.S. PATENT DOCUMENTS

| 5,304,917 A * | 4/1994 | Somerville | ........... H02J 7/0081 320/148 |
| 5,576,608 A * | 11/1996 | Nagai | ................... H02J 7/0019 320/159 |
| 6,313,832 B1 * | 11/2001 | Ishida | ................ G01R 31/3624 345/211 |
| 7,804,197 B2 * | 9/2010 | Iisaka | ................... H02J 7/0011 307/104 |
| 7,880,338 B2 * | 2/2011 | Jin | .......................... H02J 5/005 307/104 |
| 7,911,325 B2 * | 3/2011 | Nagai | ................. G06K 7/0008 340/10.2 |

(Continued)

FOREIGN PATENT DOCUMENTS

| CN | 101335469 A | 12/2008 |
| CN | 201813192 U | 4/2011 |

(Continued)

*Primary Examiner* — Naum B Levin
(74) *Attorney, Agent, or Firm* — Canon U.S.A., Inc. IP Division

(57) ABSTRACT

A power supply apparatus includes a wireless power supply unit that wirelessly supplies power to an electronic device, a wireless communication unit that wirelessly communicates with the electronic device, a detection unit that detects a change of a position of the electronic device, and a control unit that controls, based on a result detected by the detection unit, a frequency of a communication between the wireless communication unit and the electronic device.

8 Claims, 5 Drawing Sheets

(56) References Cited

U.S. PATENT DOCUMENTS

| | | | | |
|---|---|---|---|---|
| 7,956,495 B2* | 6/2011 | Jin | ............ | H02J 7/025 |
| | | | | 307/104 |
| 8,004,118 B2* | 8/2011 | Kamijo | ............ | H02J 7/025 |
| | | | | 307/104 |
| 8,193,766 B2* | 6/2012 | Rondoni | ............ | A61N 1/37247 |
| | | | | 320/108 |
| 8,463,536 B2* | 6/2013 | Yamamoto | ............ | B60L 11/182 |
| | | | | 701/300 |
| 8,482,250 B2* | 7/2013 | Soar | ............ | H01F 38/14 |
| | | | | 320/104 |
| 8,583,037 B2* | 11/2013 | Atrash | ............ | H04B 5/0031 |
| | | | | 455/41.1 |
| 8,766,592 B2* | 7/2014 | Fujita | ............ | H02J 7/0027 |
| | | | | 320/107 |
| 8,772,973 B2* | 7/2014 | Kurs | ............ | H02J 5/005 |
| | | | | 307/104 |
| 8,963,487 B2* | 2/2015 | Fukaya | ............ | H02J 5/005 |
| | | | | 320/108 |
| 9,124,124 B2* | 9/2015 | Van Wiemeersch | .... | H02J 17/00 |
| 9,160,188 B2* | 10/2015 | Kang | ............ | H02J 7/025 |
| 2004/0104706 A1* | 6/2004 | Ooi | ............ | G01R 31/3613 |
| | | | | 320/132 |
| 2005/0165461 A1* | 7/2005 | Takeda | ............ | H02J 7/025 |
| | | | | 607/61 |
| 2010/0001845 A1* | 1/2010 | Yamashita | ............ | H02J 7/025 |
| | | | | 340/10.4 |
| 2011/0184888 A1 | 7/2011 | Lee | | |
| 2011/0221387 A1* | 9/2011 | Steigerwald | ............ | B60L 11/182 |
| | | | | 320/108 |
| 2011/0223859 A1* | 9/2011 | Atrash | ............ | H04B 5/0031 |
| | | | | 455/41.1 |
| 2011/0254503 A1* | 10/2011 | Widmer | ............ | B60L 11/182 |
| | | | | 320/108 |
| 2012/0091951 A1* | 4/2012 | Sohn | ............ | H02J 7/0047 |
| | | | | 320/108 |
| 2012/0207023 A1* | 8/2012 | Tsuda | ............ | H04W 48/06 |
| | | | | 370/235 |
| 2012/0299391 A1* | 11/2012 | Tanabe | ............ | H02J 50/80 |
| | | | | 307/104 |
| 2014/0028093 A1* | 1/2014 | Aikawa | ............ | H02J 7/025 |
| | | | | 307/11 |
| 2014/0239893 A1* | 8/2014 | Akiyoshi | ............ | H02J 5/005 |
| | | | | 320/108 |
| 2014/0247052 A1* | 9/2014 | Hada | ............ | G01R 31/40 |
| | | | | 324/426 |
| 2015/0015069 A1* | 1/2015 | Choi | ............ | H02J 3/32 |
| | | | | 307/23 |
| 2015/0280790 A1* | 10/2015 | Onizuka | ............ | H02J 17/00 |
| | | | | 320/108 |
| 2015/0357702 A1* | 12/2015 | Tani | ............ | H01Q 5/321 |
| | | | | 343/904 |
| 2016/0056664 A1* | 2/2016 | Partovi | ............ | H02J 7/025 |
| | | | | 307/104 |

FOREIGN PATENT DOCUMENTS

| | | |
|---|---|---|
| CN | 102142697 A | 8/2011 |
| CN | 102694426 A | 9/2012 |
| JP | 2008-113519 A | 5/2008 |
| JP | 2009033781 A | 2/2009 |
| JP | 2009136133 A | 6/2009 |
| JP | 2012016170 A | 1/2012 |
| JP | 2012112811 A | 6/2012 |
| JP | 2012175824 A | 9/2012 |
| JP | 201205388 A | 10/2012 |
| WO | 2009/027674 A1 | 3/2009 |
| WO | 2013080786 A1 | 6/2013 |

* cited by examiner

METHOD, APPARATUS AND RECORDING MEDIUM FOR DETECTING CHANGE OF POSITION OF WIRELESSLY CHARGEABLE ELECTRONIC DEVICE

BACKGROUND

Field

Aspects of the present invention generally relate to a power supply apparatus which wirelessly supplies power.

Description of the Related Art

Recently, there has been known a wireless power supply system including a power supply apparatus and an electronic device. In such a power supply system, the power supply apparatus wirelessly outputs power to the electronic device without being connected thereto via a connector. Further, the electronic device charges a battery using the power wirelessly supplied from the power supply apparatus.

Japanese Patent Application Laid-Open No. 2008-113519 discusses such a wireless power supply system. More specifically, the power supply system includes a power supply apparatus which alternately performs communication for transmitting a command to the electronic device and power transmission to the electronic device using the same antenna.

However, the power supply apparatus discussed in Japanese Patent Application Laid-Open No. 2008-113519 is not capable of communicating with the electronic device while transmitting power to the electronic device. The power supply apparatus is thus not capable of correctly detecting the status of the electronic device and a charging status, so that power supply to the electronic device cannot be appropriately controlled.

Further, the power supply apparatus is not capable of sufficiently supplying power necessary for charging the electronic device while communicating with the electronic device. As a result, a longer time is required for charging the electronic device.

SUMMARY

Aspects of the present invention are generally directed to a power supply apparatus capable of setting timing for communicating with an electronic device for appropriately supplying power to the electronic device.

According to an aspect of the present invention, a power supply apparatus includes a wireless power supply unit that wirelessly supplies power to an electronic device, a wireless communication unit that wirelessly communicates with the electronic device, a detection unit that detects a change of a position of the electronic device and a control unit that controls, based on a result detected by the detection unit, a frequency of a communication between the wireless communication unit and the electronic device.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments and together with the description, serve to explain the principles of the present disclosure.

DESCRIPTION OF THE EMBODIMENTS

Various exemplary embodiments will be described in detail below with reference to the drawings.

Figure 1:
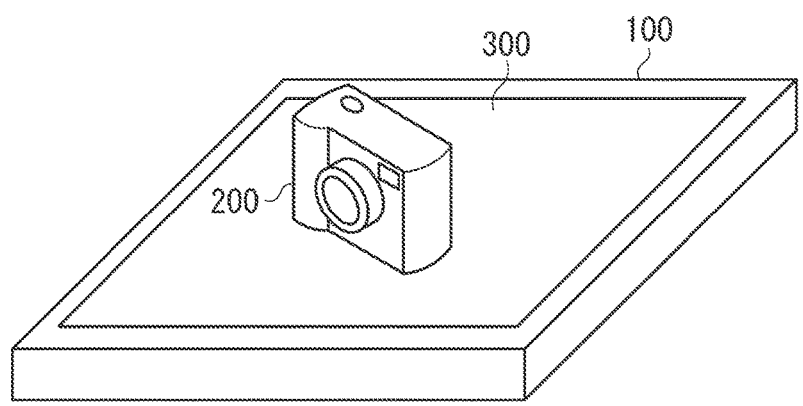
FIG. 1 illustrates an example of a power supply system according to a first exemplary embodiment.

A first exemplary embodiment will be described in detail below with reference to the drawings. Referring to FIG. 1, a power supply system according to the first exemplary embodiment includes a power supply apparatus 100 and an electronic device 200. The electronic device 200 is a device supporting wireless power supply. In the power supply system according to the first exemplary embodiment, if the electronic device 200 exists within a predetermined range 300 of the power supplying apparatus 100, the power supply apparatus 100 wirelessly supplies power to the electronic device 200. Further, if the electronic device 200 exists within the predetermined range 300, the electronic device 200 is capable of wirelessly receiving the power output from the power supply apparatus 100. On the other hand, if the electronic device 200 does not exist within the predetermined range 300, the electronic device 200 is not capable of receiving the power from the power supply apparatus 100. The predetermined range 300 is a range in which the power supply apparatus 100 can communicate with the electronic device 200. The power supply apparatus 100 may be capable of wirelessly supplying power to a plurality of electronic devices.

Further, the electronic device 200 may be an imaging apparatus, a reproduction apparatus, or a communication apparatus such as a mobile phone or a smartphone. Furthermore, the electronic device 200 may be a battery pack which includes batteries, an automobile, a display, or a personal computer.

Figure 2:
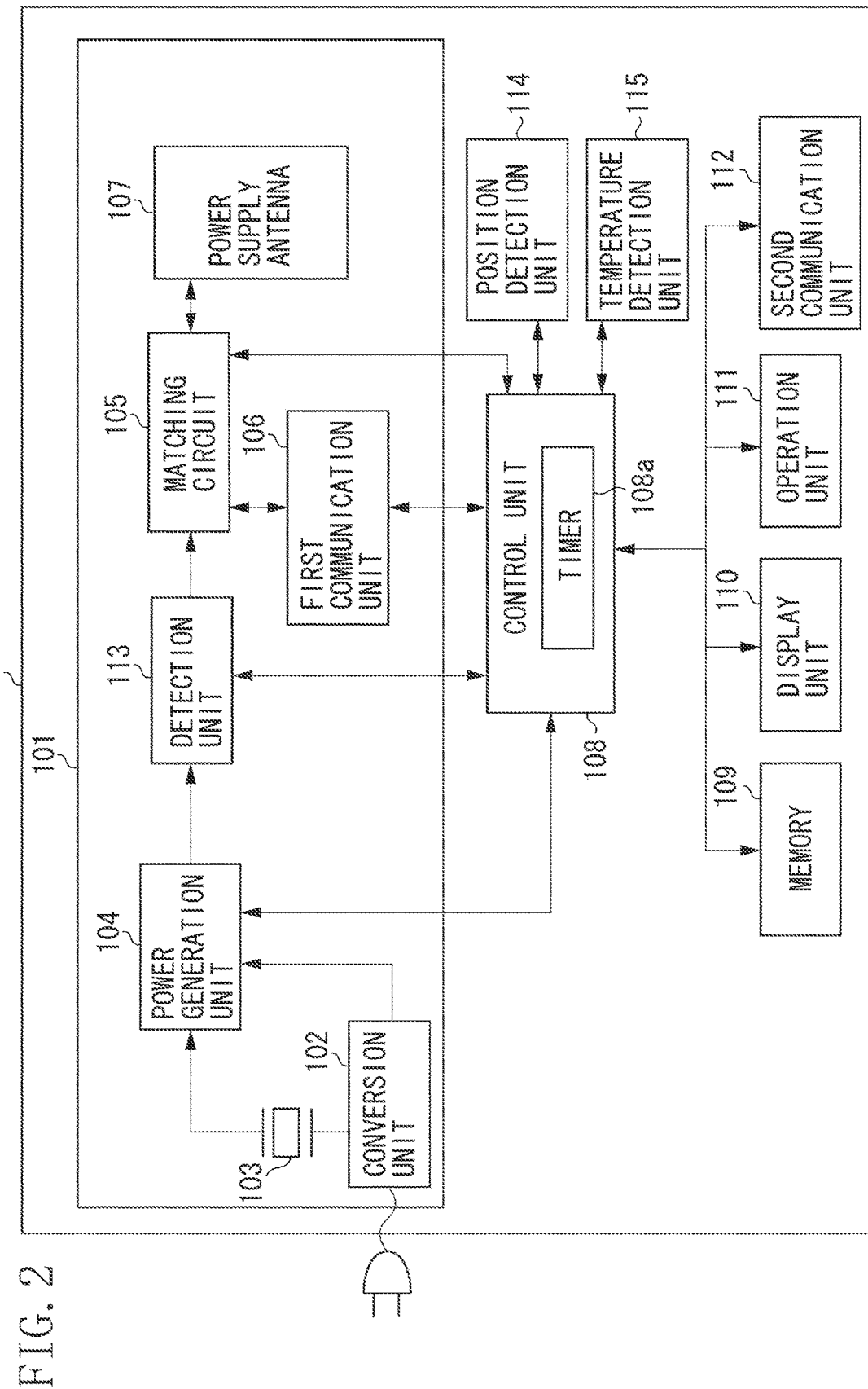
FIG. 2 is a block diagram illustrating an example of a power supply apparatus according to the first exemplary embodiment.

FIG. 2 is an example of a block diagram illustrating the power supply apparatus 100 according to the first exemplary embodiment. Referring to FIG. 2, the power supply apparatus 100 includes a power supply unit 101, a control unit 108, a memory 109, a display unit 110, an operation unit 111, and a second communication unit 112. Further, the power supply apparatus 100 includes a position detection unit 114 and a temperature detection unit 115. The power supply unit 101 includes a conversion unit 102, an oscillator 103, a power generation unit 104, a matching circuit 105, a first communication unit 106, a power supply antenna 107, and a detection unit 113.

The power supply unit 101 is used for supplying power based on a power supply method of the power supply apparatus 100. Examples of the power supply method of the power supply apparatus 100 include the one employing a magnetic resonance method. In the magnetic resonance method, power is transmitted from the power supply apparatus 100 to the electronic device 200 under the resonance state between the power supply apparatus 100 and the electronic device 200. The resonance state between the power supply apparatus 100 and the electronic device 200 is a state in which the resonance frequency of the power supply antenna 107 in the power supply apparatus 100 matches the resonance frequency of an antenna in the electronic device 200.

When an alternating current (AC) power source (not illustrated) and the power supply apparatus 100 are connected, the conversion unit 102 converts an alternating current power supplied from the AC power source (not illustrated) to a direct current power. The conversion unit 102 then supplies the converted direct current power to the power supply apparatus 100. The direct current power is supplied from the conversion unit 102 to the power generation unit 104.

The oscillator 103 generates the frequency used for controlling the power generation unit 104.

The power generation unit 104 generates power to be externally output via the power supply antenna 107, based on the power supplied from the conversion unit 102 and the frequency generated by the oscillator 103. The power generated by the power generation unit 104 includes relatively small power for communication and relatively large power for power supply, which is mainly used for power supply. The power generated by the power generation unit 104 is supplied to the power supply antenna 107 via the detection unit 113 and the matching circuit 105, both of which will be described below.

The power for communication is used by the first communication unit 106 for performing wireless communication, and is assumed to be 1 W or less, for example. Further, the power for communication may be power specified by a communication standard of the first communication unit 106. The power for power supply is used for causing the electronic device 200 to perform a charging process or a predetermined process. If the power for power supply is output via the power supply antenna 107, the first communication unit 106 is configured not to perform wireless communication via the power supply antenna 107. The power for power supply is assumed to be 2 W or greater, for example. However, as long as the power for power supply is greater than the power for communication, it is not limited to power of 2 W or greater. The charging process is a process for charging the battery connected to the electronic device 200. The predetermined process is different from the charging process. For example, the predetermined process includes at least one of a communication process for communicating with the second communication unit 112, a reproduction process for reproducing video data and audio data, and an imaging process for imaging an object. Further, the predetermined process may be a call process using a telephone line, or a process for transmitting and receiving an e-mail.

The matching circuit 105 is a resonance circuit for causing resonance between the power supply antenna 107 and the antenna of the electronic device 200, and sets the resonance frequency of the power supply antenna 107. Further, the matching circuit 105 includes a circuit for performing impedance matching between the power generation unit 104 and the power supply antenna 107.

If the power supply apparatus 100 outputs the power for communication via the power supply antenna 107, the control unit 108 controls the matching circuit 105 to set the resonance frequency of the power supply antenna 107 to a first frequency. The first frequency is 13.56 MHz, for example. Further, the first frequency may be a frequency specified by the communication standard of the first communication unit 106.

If the power supply apparatus 100 outputs the power for power supply via the power supply antenna 107, the control unit 108 controls the matching circuit 105 to set the resonance frequency of the power supply antenna 107 to a second frequency. According to the first exemplary embodiment, the first frequency and the second frequency are the same frequency.

The first communication unit 106 performs wireless communication based on Near Field Communication (NFC) standards defined by the NFC forum. Further, the communication standard of the first communication unit 106 is the International Organization for Standardization/International Electrotechnical Commission (ISO/IEC) 18092 standard, the ISO/IEC 14443 standard, and the ISO/IEC 21481 standard. When the power for communication is being output from the power supply antenna 107, the first communication unit 106 is capable of communicating with the electronic device 200 via the power supply antenna 107 for wireless power supply. However, if the power for power supply is being output via the power supply antenna 107, the first communication unit 106 does not communicate with the electronic device 200 via the power supply antenna 107. The power supply antenna 107 is an antenna for outputting one of the power for communication and the power for power supply to the electronic device 200. Further, the power supply antenna 107 is used by the first communication unit 106 for performing wireless communication with the electronic device 200 based on the NFC standard.

The power supply antenna 107 may be a loop antenna or a helical antenna.

The control unit 108 executes a computer program recorded in the memory 109 to control the power supply apparatus 100. Examples of the control unit 108 include a central processing unit (CPU) and a micro processing unit (MPU). Further, the control unit 108 is configured of hardware, and includes a timer 108a.

The memory 109 records the computer programs for controlling the power supply apparatus 100 and parameters relating to the power supply apparatus 100. Further, data obtained by at least one of the first communication unit 106 and the second communication unit 112 from the electronic device 200 is recorded in the memory 109.

The display unit 110 displays the video data supplied from the memory 109.

The operation unit 111 provides a user interface for operating the power supply apparatus 100. The operation unit 111 includes buttons, switches, and a touch panel for operating the power supply apparatus 100. The control unit 108 controls the power supply apparatus 100 according to an input signal input via the operation unit 111.

The second communication unit 112 performs wireless communication with the electronic device 200 based on the communication standard which is different from the communication standard of the first communication unit 106. Examples of the communication standard of the second communication unit 112 include a wireless local area network (LAN) standard and the Bluetooth (registered trademark) standard. The second communication unit 112 receives from the electronic device 200 data including at least one of the video data, the audio data, and a command. Further, the second communication unit 112 transmits to the electronic device 200 the data including at least one of the video data, the audio data, and the command.

The detection unit 113 detects whether an object exists near the power supply apparatus 100 using a voltage standing wave ratio (VSWR). The VSWR is a value indicating a relation between a travelling wave of the power output from the power supply antenna 107 and a reflected wave of the power output from the power supply antenna 107. The detection unit 113 is capable of detecting whether the object has been placed within the predetermined range 300 or removed from the predetermined range 300 according to a change amount of the VSWR.

If it is detected that the electronic device 200 exists within the predetermined range 300, the position detection unit 114 detects position information indicating the position of the electronic device 200. Further, the position detection unit 114 uses the detected position information about the electronic device 200 to detect whether the position of the electronic device 200 has changed by a first predetermined value or more. If the position detection unit 114 detects that the position of the electronic device 200 has changed by the first predetermined value or more, the position detection unit 114 notifies the control unit 108 that the position of the electronic device 200 has changed.

The temperature detection unit 115 detects temperature information indicating the temperature of the power supply apparatus 100. Further, the temperature detection unit 115 uses the detected temperature information about the power supply apparatus 100 to detect whether the temperature of the power supply apparatus 100 is equal to or higher than a second predetermined value. If the temperature detection unit 115 detects that the temperature of the power supply apparatus 100 is equal to or higher than the second predetermined value, the temperature detection unit 115 notifies the control unit 108 that the temperature of the power supply apparatus 100 is high. The second predetermined value is approximately 40° C., for example. The second predetermined value is set according to an upper limit value of the range of the temperature at which wireless power supply can be performed safely. Further, the second predetermined value is set according to the value of the temperature for detecting heat generation due to a foreign object. The foreign object refers to, for example, a metal and an integrated circuit (IC) card. Examples of the foreign object include a device which does not have a charging unit for charging the battery, a device which does not have a communication unit for communicating with the power supply apparatus 100, and a device which does not support the communication standard of the first communication unit 106.

The power supply apparatus 100 wirelessly supplies the power to the electronic device 200. In this specification, "wireless" may be interpreted as "contactless" or "noncontact".

The power supply apparatus 100 according to the first exemplary embodiment is capable of performing a first power supply process and a second power supply process, which will be described below. The first power supply process includes a process for transmitting the power for power supply to the electronic device 200 and a process for performing communication between the first communication unit 106 and the electronic device 200. Further, the second power supply process includes a process for transmitting the power for power supply to the electronic device 200 and a process for performing communication between the first communication unit 106 and the electronic device 200 at the timing different from the timing when the first power supply process is performed.

The time during which the power supply apparatus 100 outputs the power for power supply to the electronic device 200 via the power supply antenna 107 in the first power supply process and the second power supply process will be referred to as a "predetermined time". The first communication unit 106 cannot communicate with the electronic device 200 until the predetermined time elapses since the power supply apparatus 100 starts outputting the power for power supply.

Further, the time during which the first communication unit 106 cannot communicate with the electronic device 200 in the case of the power supply apparatus 100 performing the first power supply process is set to be shorter than that in the case of the power supply apparatus 100 performing the second power supply process. Furthermore, the predetermined time in the case of the power supply apparatus 100 performing the first power supply process is set to be shorter than the predetermined time in the case of the power supply apparatus 100 performing the second power supply process.

The power supply apparatus 100 performs a control process described below to select whether to perform the first power supply process or the second power supply process.

(The Control Process)

Figure 3:
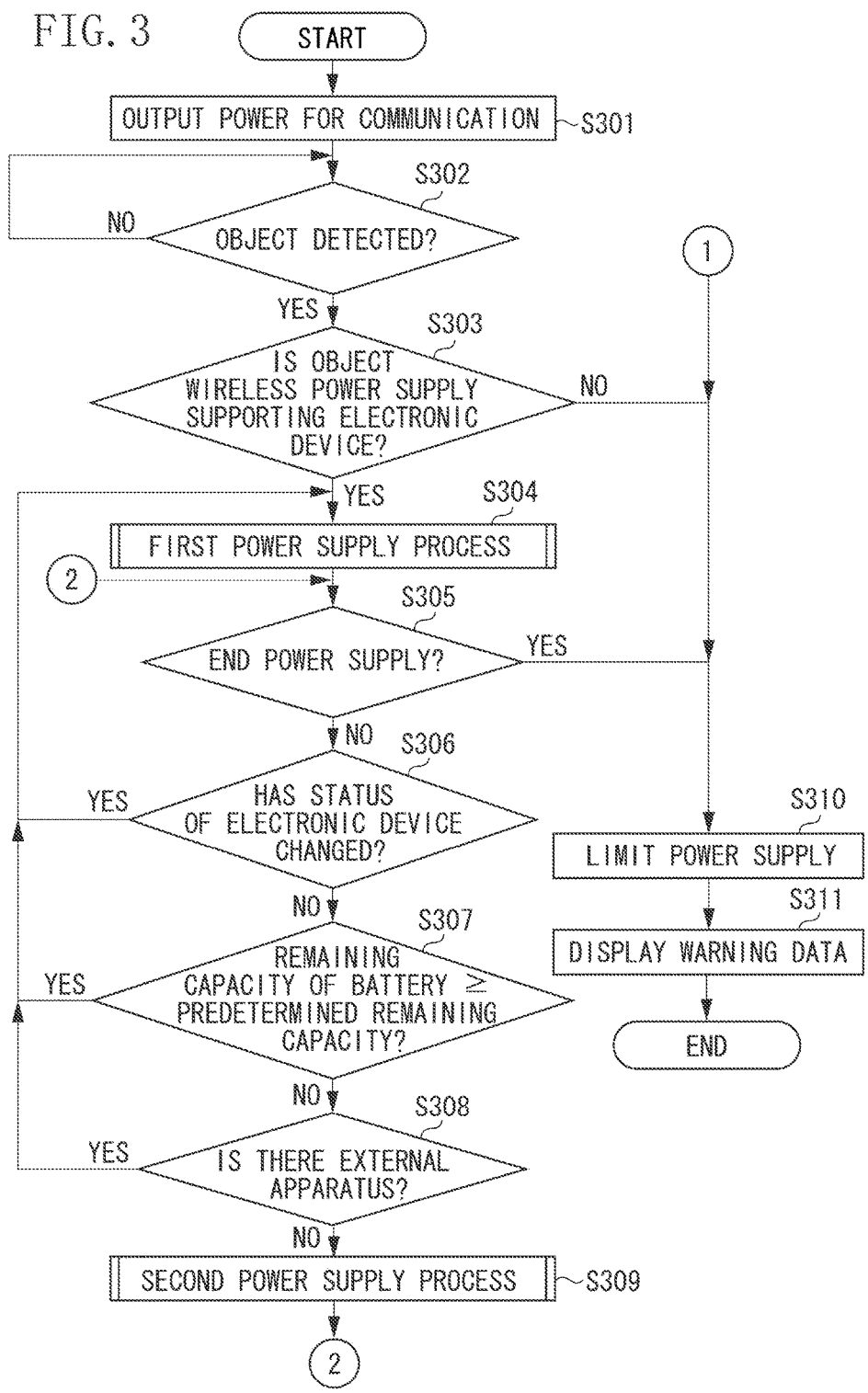
FIG. 3 is a flowchart illustrating an example of a control process according to the first exemplary embodiment.

The control process performed by the power supply apparatus 100 according to the first exemplary embodiment will be described below with reference to the flowchart illustrated in FIG. 3. The control process is realized by the control unit 108 executing the computer program stored in the memory 109.

If the power supply apparatus 100 has been turned on, the control unit 108 controls the matching circuit 105 to set the resonance frequency of the power supply antenna 107 to the first frequency, and then performs the process of step S301.

In step S301, the control unit 108 controls the power supply unit 101 to output the power for communication via the power supply antenna 107 for detecting whether the electronic device 200 exists within the predetermined range 300.

In step S302, the control unit 108 determines whether the detection unit 113 has detected that there is an object within the predetermined range 300. If the detection unit 113 has detected that there is an object within the predetermined range 300 (YES in step S302), the process proceeds to step S303. If the detection unit 113 has not detected that there is an object within the predetermined range 300 (NO in step S302), the process of step S302 is performed again.

In step S303, the control unit 108 controls the first communication unit 106 to perform an authentication process for wireless power supply. The control unit 108 then determines whether the object existing within the predetermined range 300 is the electronic device 200 based on the result of the authentication process. The authentication process is a process for obtaining, using the first communication unit 106, authentication information for wireless power supply from the object existing within the predetermined range 300. The authentication information for wireless power supply is identification information, information indicating whether the object supports the power supply method of the power supply apparatus 100, and information indicating an amount of power to be requested to the power supply apparatus 100, for example.

If the control unit 108 determines that the object existing within the predetermined range 300 is the electronic device 200, based on the result of the authentication process (YES in step S303), the process proceeds to step S304. If the control unit 108 determines that the object existing within the predetermined range 300 is not the electronic device 200 (NO in step S303), the control unit 108 determines that the object is a foreign object, and the process proceeds to step S310.

If the control unit 108 determines that the object existing within the predetermined range 300 is the electronic device 200, based on the result of the authentication process (YES in step S303), the power supply apparatus 100 starts the process for transmitting the power for power supply to the electronic device 200. In such a case, the power supply apparatus 100 shortens the predetermined time to correctly detect the status of the electronic device 200.

In step S304, the control unit 108 thus performs the first power supply process, and the process proceeds to step S305.

In step S305, the control unit 108 determines whether to end supplying power to the electronic device 200. For example, if the first communication unit 106 has received from the electronic device 200 data for requesting to end wireless power supply, the control unit 108 determines to end supplying power to the electronic device 200. Further, for example, if the first communication unit 106 has received from the electronic device 200 data indicating that the battery connected to the electronic device 200 is fully charged, the control unit 108 determines to end supplying power to the electronic device 200. Furthermore, for example, if an operation for turning off the power of the power supply apparatus 100 is performed on the operation unit 111, the control unit 108 determines to end supplying power to the electronic device 200.

If the control unit 108 determines to end supplying power to the electronic device 200 (YES in step S305), the process proceeds to step S310. If the control unit 108 determines not to end supplying power to the electronic device 200 (NO in step S305), the process proceeds to step S306.

The status of the electronic device 200 may rapidly change immediately after the power for power supply has been transmitted to the electronic device 200. In such a case, the predetermined time is shortened to correctly detect the status of the electronic device 200 by the power supply apparatus 100.

When the first power supply process or the second power supply process has been performed, the control unit 108 thus detects the status of the electronic device 200 using the status data of the electronic device 200 which has been obtained by the first communication unit 106 from the electronic device 200. Further, the control unit 108 performs the process of step S306 to select whether the power supply apparatus 100 is to perform the first power supply process or the second power supply process according to whether the status of the electronic device 200 has changed.

The status data of the electronic device 200 includes information indicating an operation mode of the electronic device 200, information indicating the amount of power which the electronic device 200 has received from the power supply apparatus 100, and information indicating the amount of power which the electronic device 200 is to request to the power supply apparatus 100. In addition, the status data of the electronic device 200 may further include information indicating the temperature inside the electronic device 200, information indicating a remaining capacity of the battery connected to the electronic device 200, and information about charging of battery performed by the electronic device 200. Furthermore, the status data of the electronic device 200 may include information indicating power consumption of the electronic device 200.

In step S306, the control unit 108 determines whether the status of the electronic device 200 has changed. For example, if the control unit 108 is notified by the position detection unit 114 that the position of the electronic device 200 has changed by a first predetermined amount or greater, the control unit 108 determines that the status of the electronic device 200 has changed. If, for example, the user moves the electronic device 200, the position of the electronic device 200 may change by the first predetermined amount or greater.

Further, the control unit 108 detects whether the operation mode of the electronic device 200 has changed using, for example, the status data which the first communication unit 106 has received from the electronic device 200. If the control unit 108 detects that the operation mode of the electronic device 200 has changed, the control unit 108 determines that the status of the electronic device 200 has changed.

Furthermore, if the control unit 108 detects that the power consumption of the electronic device 200 has changed by a third predetermined value or greater using, for example, the status data which the first communication unit 106 has received from the electronic device 200, the control unit 108 determines that the status of the electronic device 200 has changed.

Moreover, for example, if the amount of power which the electronic device 200 has received from the power supply apparatus 100 has decreased by a predetermined amount or greater, the control unit 108 determines that the status of the electronic device 200 has changed. If, for example, the user has moved the electronic device 200 or an external device being different from the electronic device 200 is receiving the power output from the power supply apparatus 100, the amount of power which the electronic device 200 has received from the power supply apparatus 100 may decrease by the predetermined amount or greater. The external device is a device supporting wireless power supply, similar to the electronic device 200.

If the control unit 108 determines that the status of the electronic device 200 has changed as described above (YES in step S306), the process returns to step S304. On the other hand, if the control unit 108 determines that the status of the electronic device 200 has not changed (NO in step S306), the process proceeds to step S307. However, even in such a case, the charging status of the electronic device 200 may change. The power supply apparatus 100 controls power supply to the electronic device 200 just before the charging process of the electronic device 200 is completed so as not to supply excessive power to the electronic device 200. The power supply apparatus 100 thus shortens the predetermined time for correctly detecting the status of the electronic device 200 immediately before the battery connected to the electronic device 200 is fully charged.

The control unit 108 thus performs the process of step S307 for selecting whether the power supply apparatus 100 is to perform the first power supply process or the second power supply process according to the remaining capacity of the battery connected to the electronic device 200.

More specifically, in step S307, the control unit 108 detects the remaining capacity of the battery using the status data which the first communication unit 106 has received from the electronic device 200. Further, the control unit 108 determines whether the remaining capacity of battery is equal to or greater than a predetermined remaining capacity using the detection result. The predetermined remaining capacity corresponds to the remaining capacity which is little less than the remaining capacity of the battery determined to be fully charged. If the control unit 108 determines that the remaining capacity of the battery is equal to or greater than a predetermined remaining capacity (YES in step S307), the process returns to step S304. If the control unit 108 determines that the remaining capacity of battery is less than the predetermined remaining capacity (NO in step S307), the process proceeds to step S308.

If the control unit 108 determines that the remaining capacity of battery is less than the predetermined remaining capacity (NO in step S307), it is highly possible that the status of the electronic device 200 is stable. However, the external device may be newly placed within the predetermined range 300. In such a case, the power output from the power supply apparatus 100 is supplied to and shared by the electronic device 200 and the external device. The power received by the electronic device 200 from the power supply apparatus 100 may then rapidly decrease. The electronic device 200 thus cannot receive the desired power from the power supply apparatus 100, so that the electronic device 200 becomes unable to continue the charging process or the predetermined process. To prevent such a state, the power supply apparatus 100 correctly detects the status of the electronic device 200, and performs the process for supplying the desired power to the electronic device 200 according to the detection result. The power supply apparatus 100 thus shortens the predetermined time.

The control unit 108 thus performs the process of step S308 for selecting whether the power supply apparatus 100 is to perform the first power supply process or the second power supply process according to whether the external device exists within the predetermined range 300.

More specifically, in step S308, the control unit 108 determines whether the external device exists within the predetermined range 300 by performing a process similar to those performed in steps S302 and S303. If the control unit 108 determines that the external device exists within the predetermined range 300 (YES in step S308), the process returns to step S304. On the other hand, if the control unit 108 determines that the external device does not exist within the predetermined range 300 (NO in step S308), the process proceeds to step S309.

If the control unit 108 determines that the external device does not exist within the predetermined range 300 (NO in step S308), it is highly possible that the status of the electronic device 200 is stable. The power supply apparatus 100, therefore, extends the predetermined time so that the time during which the power for power supply is output to the electronic device 200 becomes longer, to reduce the time necessary for charging the electronic device 200.

In step S309, the control unit 108 thus performs the second power supply process, and the process then returns to step S305.

On the other hand, in step S310, the control unit 108 controls the power supply unit 101 to limit power supply.

If the power for communication or the power for power supply is being output via the power supply antenna 107, the control unit 108 controls the power supply unit 101 to limit the output of power or to stop outputting the power. After the power output is controlled, the process proceeds to step S311.

In step S311, the control unit 108 controls the display unit 110 to display warning data. The warning data is, for example, data for notifying the user that the power supply apparatus 100 has ended wireless power supply. Further, if the object existing within the predetermined range 300 is not the electronic device 200 (NO in step S303), the warning data may notify the user that a foreign object exists within the predetermined range 300.

The warning data may be data recorded in the memory 109 or data obtained from the electronic device 200. If the process of step S311 is performed, the process of the flowchart illustrated in FIG. 3 ends. The control unit 108 then performs the control process of FIG. 3 again.

(The First Power Supply Process)

The first power supply process performed in step S304 illustrated in FIG. 3 will be described below with reference to the flowchart illustrated in FIG. 4. The first power supply process is realized by the control unit 108 executing the computer program stored in the memory 109.

In step S401, the control unit 108 sets the predetermined time to a first time. The predetermined time corresponds to a non-communication time. The first time is previously recorded in the memory 109. Further, the first time may be the time which has been requested from the electronic device 200 when the control unit 108 has performed the authentication process. The first time is approximately 30 seconds, for example. The control unit 108 records information indicating that the predetermined time is set to the first time in the memory 109, and the process proceeds to step S402.

In step S402, the control unit 108 controls the matching circuit 105 to set the resonance frequency of the power supply antenna 107 to the second frequency. The control unit 108 then controls the power supply unit 101 to output the power for power supply via the power supply antenna 107. Further, the control unit 108 controls the timer 108a to measure an elapsed time from when the power for power supply is output. If the power for power supply has been output, the process proceeds to step S403. If the authentication process has been performed, the control unit 108 sets the value of the power for power supply according to the amount of power requested from the electronic device 200. Further, if the process of step S402 is to be performed again after the first communication unit 106 has obtained the status data from the electronic device 200, the control unit 108 sets the value of the power for power supply according to the status data of the electronic device 200.

In step S403, the control unit 108 determines whether an error has occurred in the power supply apparatus 100.

For example, if the temperature detection unit 115 has notified the control unit 108 that the temperature of the power supply apparatus 100 is equal to or higher than the second predetermined value, the control unit 108 determines that an error has occurred in the power supply apparatus 100 (YES in step S403). The process then proceeds to step S310. If the control unit 108 determines that an error has not occurred in the power supply apparatus 100 (NO in step S403), the process then proceeds to step S404.

In step S404, the control unit 108 determines whether the time being measured by the timer 108 is equal to or longer than the first time. If the time being measured by the timer 108a is equal to or longer than the first time, the control unit 108 determines that the predetermined time has elapsed (YES in step S404), and the process proceeds to step S405. If the control unit 108 determines that the predetermined time has not elapsed (NO in step S404), the process proceeds to step S408.

In step S405, the control unit 108 controls the matching circuit 105 to set the resonance frequency of the power supply antenna 107 to the first frequency. The control unit 108 then controls the power supply unit 101 to output the power for communication via the power supply antenna 107. The process then proceeds to step S406.

In step S406, the control unit 108 controls the first communication unit 106 to transmit to the electronic device 200 a command for obtaining the status data of the electronic device 200 from the electronic device 200. The process then proceeds to step S407.

In step S407, the control unit 108 determines whether an error has occurred in the electronic device 200.

For example, the control unit 108 determines whether an error has occurred in the electronic device 200 according to whether the first communication unit 106 has received the status data of the electronic device 200 from the electronic device 200. If the first communication unit 106 has not received the status data of the electronic device 200 from the electronic device 200, the control unit 108 determines that an error has occurred in the electronic device 200 (YES in step S407). The process then proceeds to step S310. If the control unit 108 determines that an error has not occurred in the electronic device 200 (NO in step S407), the first power supply process illustrated in the flowchart of FIG. 4 ends, and the process proceeds to step S305 illustrated in FIG. 3.

Further, the control unit 108 may determine whether an error has occurred in the electronic device 200 using the status data of the electronic device 200 which the first communication unit 106 has received from the electronic device 200.

Furthermore, in step S406, the control unit 108 may control the first communication unit 106 to transmit to the electronic device 200 a command for further obtaining data other than the status data of the electronic device 200 from the electronic device 200. The data other than the status data of the electronic device 200 is, for example, data to be used by the second communication unit 112 to communicate with the electronic device 200.

In step S408, the control unit 108 determines whether the electronic device 200 has been removed from the predetermined range 300.

More specifically, in step S408, the control unit 108 determines whether the detection unit 113 has detected that the electronic device 200 had been removed from the predetermined range 300. If the detection unit 113 has detected that the electronic device 200 had been removed from the predetermined range 300 (YES in step S408), the process proceeds to step S310. If the detection unit 113 has not detected that the electronic device 200 had been removed from the predetermined range 300 (NO in step S408), the process of step S402 is performed again.

(The Second Power Supply Process)

Figure 5:
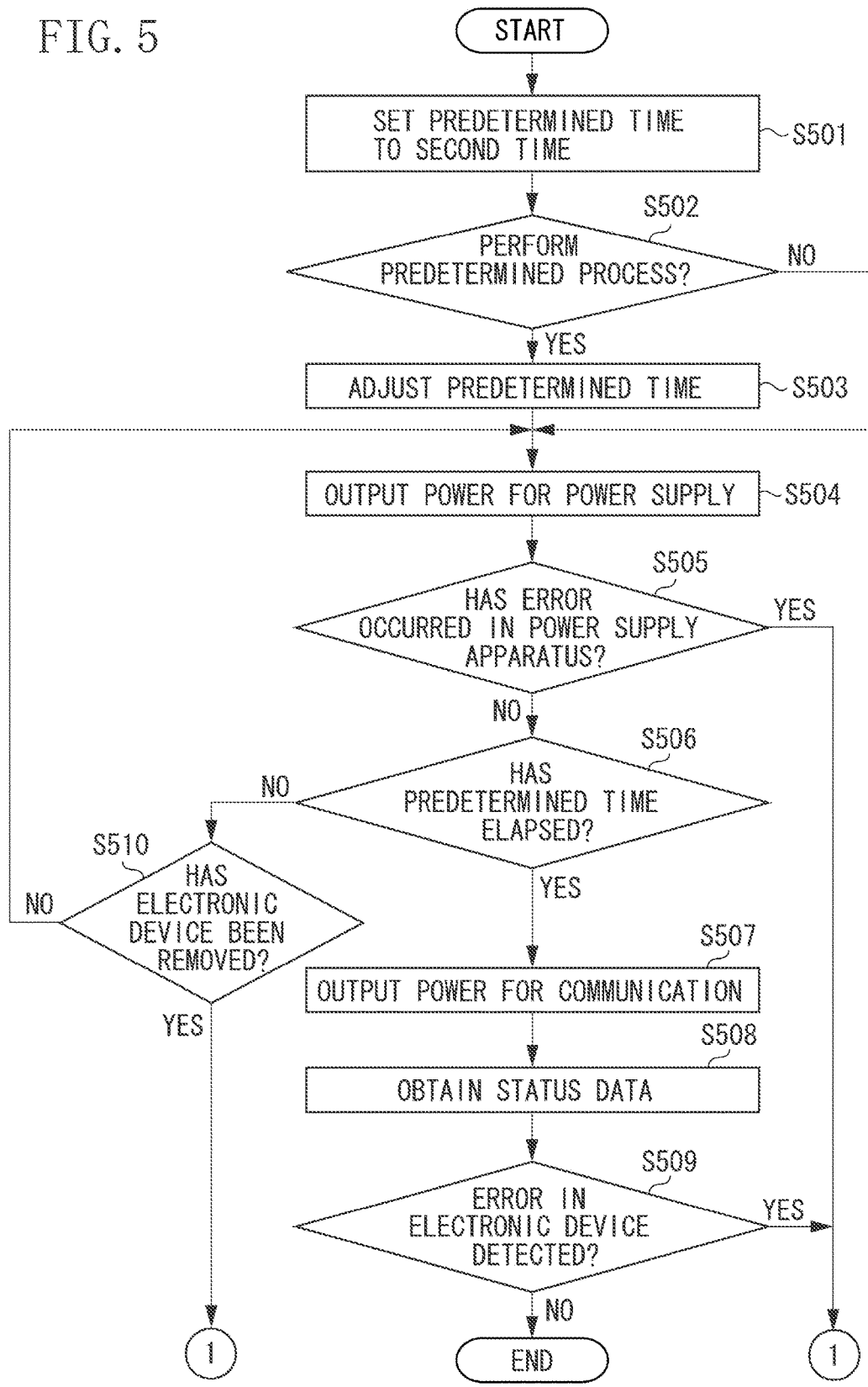
FIG. 5 is a flowchart illustrating an example of a second power supply process according to the first exemplary embodiment.

Next, the second power supply process performed in step S309 illustrated in FIG. 3 will be described below with reference to the flowchart illustrated in FIG. 5. The second power supply process is realized by the control unit 108 executing the computer program stored in the memory 109.

In step S501, the control unit 108 sets the predetermined time as a second time. The second time is previously recorded in the memory 109, and is longer than the first time, e.g., approximately three minutes. Further, the second time may be the time which has been requested from the electronic device 200 when the control unit 108 has performed the authentication process. The control unit 108 records information indicating that the predetermined time is set to the second time in the memory 109, and the process proceeds to step S502.

In step S502, the control unit 108 determines whether the electronic device 200 is to perform the predetermined process. For example, if an operation for causing the second communication unit 112 to communicate with the electronic device 200 is performed on the operation unit 111, the control unit 108 determines that the electronic device 200 is to perform the predetermined process. Further, if, for example, the first communication unit 106 has received from the electronic device 200 data for notifying that the predetermined process is to be performed, the control unit 108 determines that the electronic device 200 is to perform the predetermined process.

If the control unit 108 determines that the electronic device 200 is to perform the predetermined process (YES in step S502), the process proceeds to step S503. If the control unit 108 determines that the electronic device 200 is not to perform the predetermined process (NO in step S502), the process proceeds to step S504.

In step S503, the control unit 108 adjusts the predetermined time set in step S501 according to the predetermined process to be performed by the electronic device 200. For example, the control unit 108 adjusts the predetermined time according to the period of time during which the electronic device 200 is to perform the predetermined process, or the power consumption corresponding to the predetermined process to be performed by the electronic device 200. Further, in step S503, the control unit 108 adjusts the predetermined time not to be equal to or shorter than the first time, and the process proceeds to step S504.

In step S504, the control unit 108 controls the matching circuit 105 to set the resonance frequency of the power supply antenna 107 to the second frequency. The control unit 108 then controls the power supply unit 101 to output the power for power supply via the power supply antenna 107. Further, the control unit 108 controls the timer 108*a* to measure an elapsed time from when the power for power supply is output. If the power for power supply has been output, the process proceeds to step S505. In step S504, the control unit 108 sets the value of the power for power supply according to the status data of the electronic device 200.

Figure 4:
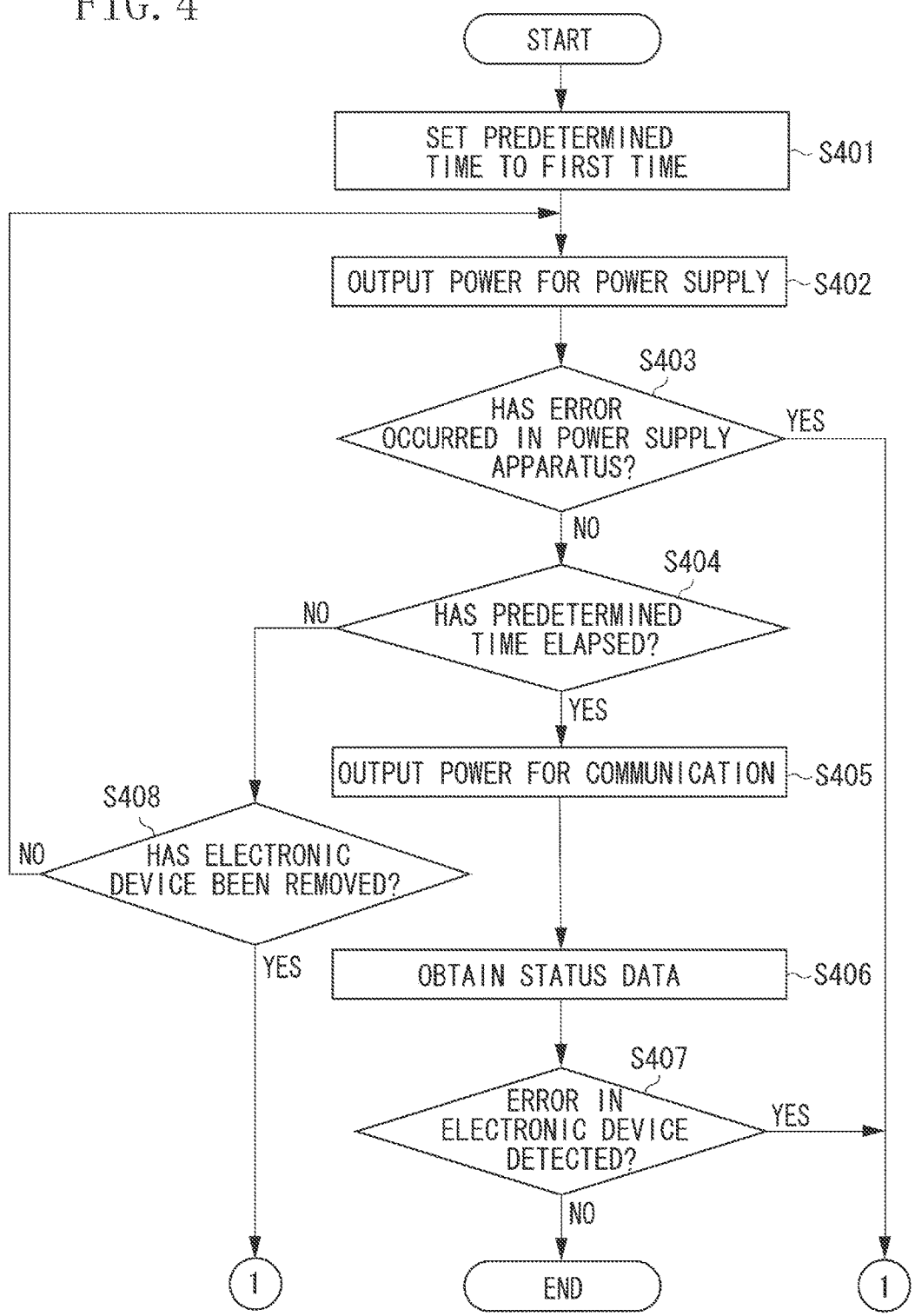
FIG. 4 is a flowchart illustrating an example of a first power supply process according to the first exemplary embodiment.

In step S505, the control unit 108 determines whether an error has occurred in the power supply apparatus 100, similar to the process performed in step S403 of the flowchart illustrated in FIG. 4. If the control unit 108 determines that an error has occurred in the power supply apparatus 100 (YES in step S505), the process proceeds to step S310 of the flowchart illustrated in FIG. 3. If the control unit 108 determines that an error has not occurred in the power supply apparatus 100 (NO in step S505), the process proceeds to step S506.

In step S506, the control unit 108 determines whether the time being measured by the timer 108 is equal to or longer than the second time. If the time being measured by the timer 108 is equal to or longer than the second time, the control unit 108 determines that the predetermined time has elapsed (YES in step S506), and the process proceeds to step S507. If the control unit 108 determines that the predetermined time has not elapsed (NO in step S506), the process proceeds to step S510.

In step S507, the control unit 108 controls the matching circuit 105 to set the resonance frequency of the power supply antenna 107 to the first frequency. The control unit 108 then controls the power supply unit 101 to output the power for communication via the power supply antenna 107. This is similar to the process performed in step S405.

In step S508, the control unit 108 controls the first communication unit 106 to transmit to the electronic device 200 the command for obtaining the status data of the electronic device 200 from the electronic device 200, similar to the process performed in step S406. The process then proceeds to step S509. In step S508, the control unit 108 may control the first communication unit 106 to transmit to the electronic device 200 a command for further obtaining the data other than the status data of the electronic device 200 from the electronic device 200.

In step S509, the control unit 108 determines whether an error has occurred in the electronic device 200, similar to the process performed in step S407. If the control unit 108 determines that an error has occurred in the electronic device 200 (YES in step S509), the process proceeds to step S310. If the control unit 108 determines that an error has not occurred in the electronic device 200 (NO in step S509), the process returns to step S305 illustrated in FIG. 3.

In step S510, the control unit 108 determines whether the electronic device 200 has been removed from the predetermined range 300, similar to the process performed in step S408. If the control unit 108 determines that the electronic device 200 has been removed from the predetermined range 300 (YES in step S510), the process proceeds to step S310. If the control unit 108 determines that the electronic device 200 has not been removed from the predetermined range 300 (NO in step S510), the process of step S504 is performed again.

As described above, when the power supply apparatus 100 according to the first exemplary embodiment starts outputting the power for power supply, the power supply apparatus 100 sets the timing when the first communication unit 106 performs communication so that the time during which the first communication unit 106 is unable to communicate with the electronic device 200 becomes short. As a result, the power can be appropriately supplied to match the status of the electronic device 200 from the beginning.

Further, if the status of the electronic device 200 has changed, the power supply apparatus 100 sets the timing when the first communication unit 106 performs communication so that the time during which the first communication unit 106 is unable to communicate with the electronic device 200 becomes short.

Furthermore, if the remaining capacity of the battery of the electronic device 200 is equal to or greater than the predetermined remaining capacity, the power supply apparatus 100 sets the timing when the first communication unit 106 performs communication so that the time during which the first communication unit 106 is unable to communicate with the electronic device 200 becomes short.

Moreover, if the electronic device 200 and the external device exist within the predetermined arrange 300, the power supply apparatus 100 sets the timing when the first communication unit 106 performs communication so that the time during which the first communication unit 106 is unable to communicate with the electronic device 200 becomes short. Further, the power supply apparatus 100 controls power supply to the electronic device 200 using the data which the first communication unit 106 has obtained from the electronic device 200.

Furthermore, if the status of the electronic device 200 has not changed and the remaining capacity of the battery is less than the predetermined remaining capacity, the power supply apparatus 100 sets the timing when the first communication unit 106 performs communication so that the power for power supply is output to the electronic device 200 for a longer time.

Consequently, according to the present exemplary embodiment, the power supply apparatus 100 continuously detects the status of the electronic device 200, so that the power supply apparatus 100 is capable of increasing communication frequency if the status of the electronic device 200 changes. Further, according to the present exemplary embodiment, when there is little change in the status of the electronic device 200, the power supply apparatus 100 reduces the communication frequency and increases power supply efficiency. As a result, the efficiency of power supply to the electronic device 200 can be adaptively improved.

According to the first exemplary embodiment, the first frequency and the second frequency have been described to be the same frequency. However, the first frequency and the second frequency may be different frequencies. In such a case, if the first frequency is 13.56 MHz, the second frequency may be any frequency other than the first frequency. For example, the second frequency may be 6.78 MHz or several tens of MHz. Further, the second frequency may be any frequency from 100 KHz to 205 KHz.

Further, the control unit 108 is assumed to be capable of performing the control process, the first power supply process, and the second power supply process even if the first communication unit 106 performs communication based on a Transfer Jet standard instead of the NFC standard. In such a case, the first frequency is set to 4.48 GHz, for example.

According to the first exemplary embodiment, the power supply method of the power supply apparatus 100 has been described above to be the one employing the magnetic resonance method. However, the power supply method of the power supply apparatus 100 is not limited to the one employing the magnetic resonance method. For example, the power supply method of the power supply apparatus 100 may employ an electromagnetic induction method, or an electric field coupling method, instead of employing the magnetic resonance method. Further, for example, the power supply method of the power supply apparatus 100 may employ a Qi standard defined by the Wireless Power Consortium (WPC), or the standard defined by the Alliance for Wireless Power (A4WP).

The power supply apparatus 100 according to the first exemplary embodiment has been described in which the power supply antenna 107 is used for transmitting the power for communication and the power for power supply. However, as long as the power supply apparatus 100 is capable of alternately outputting the power for communication and the power for power supply, the control unit 108 is assumed to be capable of performing the control process, the first power supply process, and the second power supply process. Accordingly, as long as the power supply apparatus 100 is capable of alternately outputting the power for communication and the power for power supply, the power supply apparatus 100 may have separate antennas for transmitting the power for communication and for transmitting the power for power supply.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-123213 filed Jun. 11, 2013, which is hereby incorporated by reference herein in its entirety.

What is claimed is:

1. A power supply apparatus comprising:
a wireless power supply unit that wirelessly supplies power to an electronic device;
a wireless communication unit that wirelessly communicates with the electronic device;
a detection unit that detects a change of a position of the electronic device; and
a control unit that sets a predetermined time for supplying power to the electronic device,
wherein the control unit sets, regardless of a direction of the change of the position of the electronic device, the predetermined time to a first time in a case where the detection unit detects the change of the position of the electronic device,
wherein the control unit sets the predetermined time to a second time in a case where the detection unit does not detect the change of the position of the electronic device,
wherein the control unit controls the wireless power supply unit to wirelessly supply power to the electronic device for the set predetermined time, and
wherein the first time is shorter than the second time.

2. The power supply apparatus according to claim 1, further comprising a remaining capacity detection unit that detects a remaining capacity of a battery connected to the electronic device,
wherein the control unit sets the predetermined time to the first time in a case where the remaining capacity detection unit detects that the remaining capacity of the battery connected to the electronic device is more than a predetermined remaining capacity,
wherein the control unit sets the predetermined time to the second time in a case where the remaining capacity detection unit detects that the remaining capacity of the battery connected to the electronic device is not more than the predetermined remaining capacity.

3. The power supply apparatus according to claim 1, wherein the detection unit detects the change of the position of the electronic device repeatedly until charging of the battery ends since the charging of the battery is started.

4. The power supply apparatus according to claim 1, wherein the wireless communication unit wirelessly communicates with the electronic device to obtain status data of the electronic device.

5. The power supply apparatus according to claim 1, wherein a supply of power and the communication between the wireless communication unit and the electronic device are performed alternately, and wherein the supply of power is performed to cause the electronic device to perform at least one of a charging process and a predetermined process.

6. The power supply apparatus according to claim 1, wherein the control unit controls the wireless communication unit to communicate with the electronic device after the set predetermined time for supplying the power to the electronic device has elapsed.

7. A power supply method comprising:
wirelessly communicating with an electronic device;
detecting a change of a position of the electronic device;
wirelessly supplying power to the electronic device for a predetermined time;
setting, regardless of a direction of the change of the position of the electronic device, the predetermined time to a first time in a case where the change of the position of the electronic device is detected; and
setting the predetermined time to a second time in a case where the change of the position of the electronic device is not detected,
wherein the first time is shorter than the second time.

8. A non-transitory computer-readable recording medium storing computer executable instructions for causing a computer to execute a method, the method comprising:
wirelessly communicating with an electronic device;
detecting a change of a position of the electronic device;
wirelessly supplying power to the electronic device for a predetermined time;
setting regardless of a direction of the change of the position of the electronic device, the predetermined time to a first time in a case where the change of the position of the electronic device is detected; and
setting the predetermined time to a second time in a case where the change of the position of the electronic device is not detected,
wherein the first time is shorter than the second time.

* * * * *